United States Patent [19]
Artusi

[11] Patent Number: 5,286,107
[45] Date of Patent: Feb. 15, 1994

[54] ENAMEL COATED STIRRER WITH PADDLES DETACHABLY FIXED ON THE SHAFT IN ENAMEL TO ENAMEL COUPLING WITHOUT ANY GASKET

[75] Inventor: Gianni Artusi, San Donà di Piave, Italy

[73] Assignee: Tycon S.p.A., San Donà di Piave, Italy

[21] Appl. No.: 709,162

[22] Filed: Jun. 3, 1991

Related U.S. Application Data

[63] Continuation-in-part of Ser. No. 509,811, Apr. 17, 1990, abandoned.

[30] Foreign Application Priority Data

Apr. 17, 1989 [IT] Italy ................................ 20174 A/89
Aug. 7, 1989 [IT] Italy ................................ 21469 A/89

[51] Int. Cl.$^5$ .................................................. B01F 7/22
[52] U.S. Cl. ..................................... 366/325; 366/343; 366/247; 416/241 B; 416/244 R; 403/383
[58] Field of Search ............. 366/343, 325, 342, 330, 366/247; 416/214 R, 241 B; 29/887; 403/383, 345

[56] References Cited

U.S. PATENT DOCUMENTS

| | | | |
|---|---|---|---|
| 2,811,339 | 10/1957 | Osborne et al. | 416/214 |
| 4,003,677 | 1/1977 | Parkes | 416/214 R |
| 4,221,488 | 9/1980 | Nunlist et al. | 366/343 |
| 4,264,215 | 4/1981 | Nunlist et al. | 366/343 |
| 4,365,897 | 12/1982 | Amorese et al. | 366/343 |
| 4,508,455 | 4/1985 | Lerman et al. | 416/241 B |
| 4,601,583 | 7/1986 | Amorese | 366/343 |
| 4,606,103 | 8/1986 | Koehl et al. | 416/241 B |
| 4,628,574 | 12/1986 | Lerman | 416/241 B |
| 4,722,608 | 2/1988 | Salzman et al. | 366/343 |
| 4,826,347 | 5/1989 | Baril et al. | 403/383 |

FOREIGN PATENT DOCUMENTS 962464  6/1950  France .................. 416/214

Primary Examiner—Harvey C. Hornsby
Assistant Examiner—Patrick F. Brinson

[57] ABSTRACT

A stirrer having a complete enamel coating suitable for mounting in a closed coverless reaction vessel, being provided with paddles which are detachably fixed on the shaft for operation inside the vessel by an enamel to enamel coupling obtained by simple pressure without the use of gaskets.

8 Claims, 8 Drawing Sheets

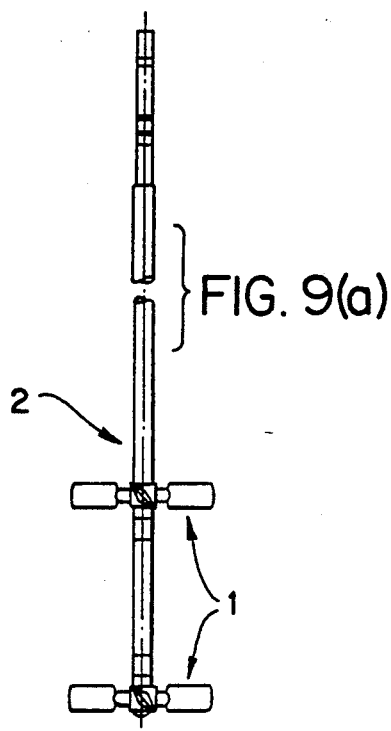
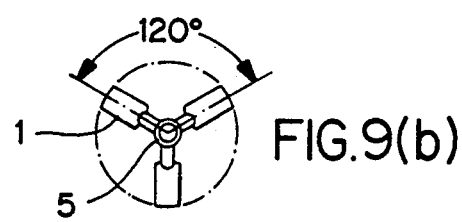
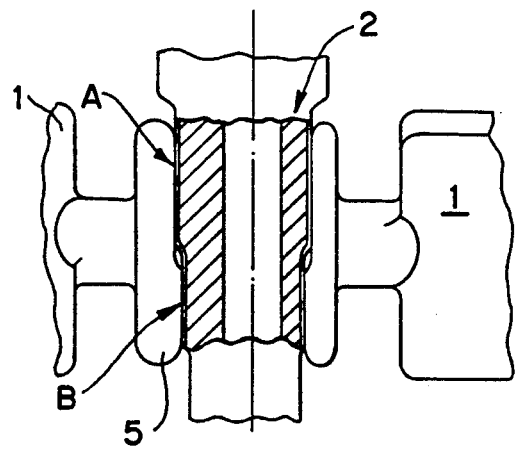
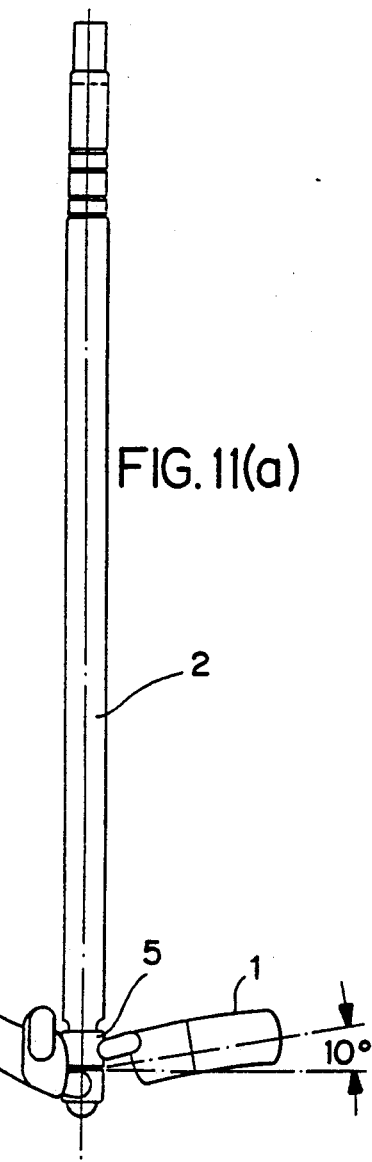
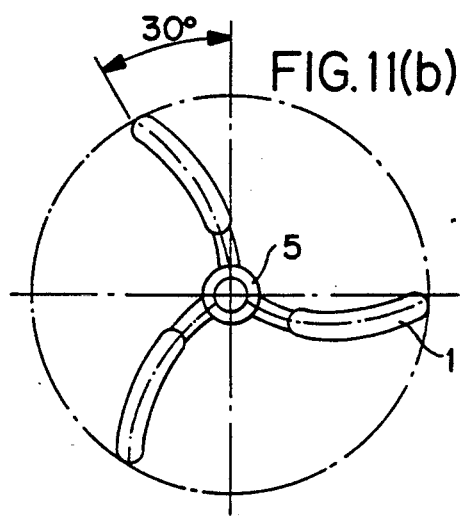
FIG. 9(a)
FIG. 9(b)
FIG. 10
FIG. 11(a)
FIG. 11(b)

ENAMEL COATED STIRRER WITH PADDLES DETACHABLY FIXED ON THE SHAFT IN ENAMEL TO ENAMEL COUPLING WITHOUT ANY GASKET

This application is a continuation in part of application Ser. No. 509,811 filed Apr. 17, 1990, now abandoned.

The present invention refers to stirrers having a complete enamel coating with separable paddles, in which the coupling between shaft and paddles is made by direct contact of enamelled surfaces, enamel on enamel, with no gasket.

The resistance of the coupling to mechanical stresses is obtained by causing a strong mechanical pressure on the contact surfaces of the coupling, employing conically shaped coupling or elliptic (or oval) coupling or mixed half conical and half elliptic or oval coupling, without having recourse to methods based on thermally induced dimensional changes.

BACKGROUND OF THE INVENTION

As known, stirrers having a complete enamel coating with separable paddles are employed in completely closed (coverless) reaction vessels, provided with manholes of reduced diameter so that they can withstand elevated working pressures.

They can be employed, in particular in case one wants to exchange in the closed coverless vessel a previously used stirrer of small dimensions, e.g. a propeller type stirrer for a larger stirrer, i.e. an anchor type stirrer.

The detachable paddle system has the advantage that the paddles can be exchanged on an installed shaft, leaving the whole mechanical apparatus unchanged.

Essentially two types of enamel coated stirrers with separable paddles with direct gasket-free paddle to shaft connection are presently known. They are as follows:

1) the type described in the Sybron, U.S. Pat. No. 4,221,488, in which the connection between shaft and paddle hub is obtained by a cryogenic system on perfectly cylindrical contact surfaces machined in such a way as to have a slight dimensional interference between the inserting and the receiving member (at a same temperature); and 2) the type described in the De Dietrich, European Patent No. 145,370, in which the end of the shaft has an incorporated paddle bearing hub provided with radial cavities for the insertion of the single paddles having an insertion stem, the connection between hub and paddle taking place on slightly conical surfaces and is performed by forced insertion.

BRIEF DESCRIPTION OF THE DRAWINGS

FIG. 9(a) shows another embodiment of the invention having multiple impeller hubs;

FIG. 9(b) shows a top view of one propeller of FIG. 9(a);

FIG. 10 shows another embodiment of the invention wherein the shaft is inserted into the central cavity of the impeller hub, the cavity and the end of the shaft each having a frusto-conical part and an oval cross-section part;

FIG. 11(a) shows an embodiment of the invention wherein two paddle hubs are placed on the shaft, one adjacent to the other; and FIG. 11(b) shows a top view of the propeller of FIG. 11(a).

DETAILED DESCRIPTION OF THE EMBODIMENTS

The inventor has now realized new types of enamelled stirrers with separable paddles, wherein the paddles are borne by a hub separable from the shaft and which present some advantages with respect to both the prior art types.

The first type realized by the inventor presents a completely enamel coated impeller, the enamel coating being indicated by the numeral 11 wherein paddles and hub are formed in one piece. The connection with the shaft can be performed in two ways: in the first (see FIG. 1) the impeller 1 is provided with a central hole through which the suitably shaped shaft 2 is inserted to obtain a perfect fit; and, in the second way (see FIG. 2), the impeller is provided with a central journal (or pin) 3 facing up, which journal can be inserted in the shaft, the lower end of which is bell shaped 4 and internally machined to a surface corresponding to said journal.

The second type realized by the inventor comprises single detachable paddles inserted in a central hub, which in turn is fixed at the end of the stirrer shaft. The connections between paddles and hub are performed through frusto-conical junctions and forced insertion.

Figure 3:
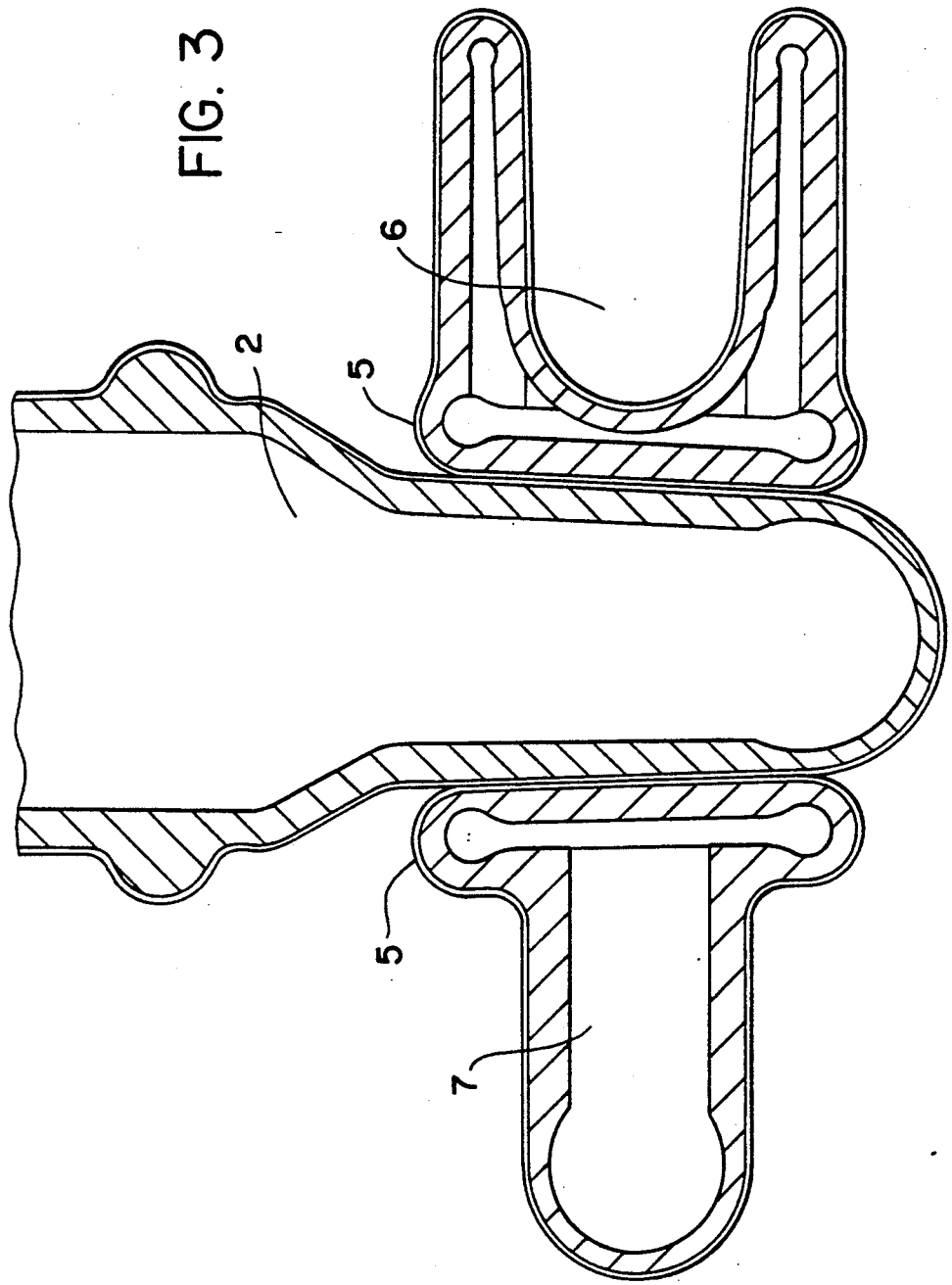
FIG. 3 is a third embodiment of the invention showing a hub having a central cavity for the connection with the shaft and frusto-conical cavities and/or pins radially distributed for mounting paddles.
Figure 4:
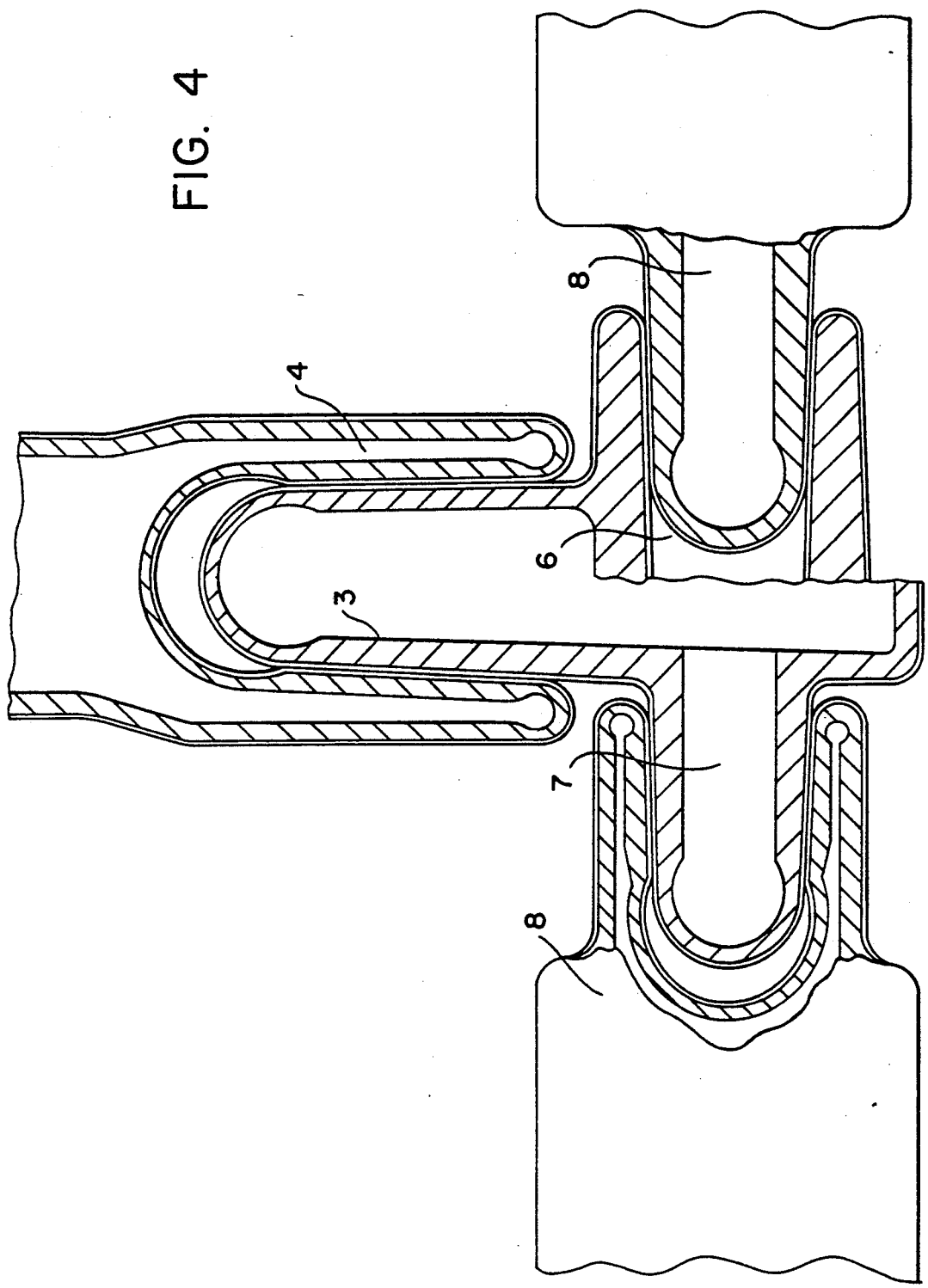
FIG. 4 is a fourth embodiment of the invention showing single detachable paddles inserted into a central hub provided with a journal for insertion in the bell shaped end of the shaft.

Various types can be foreseen, as represented in FIGS. 3 and 4. In FIG. 3, the central hub is ring shaped with a central hole 5, in which the stirrer shaft is inserted. The hub may show along its outside circumference frusto-conical cavities 6, shown on the right hand side of the figure, for inserting the stems of the radially arranged paddles, or it can show radially distributed pins 7 (see left hand side of the figure) on which each single paddle provided with a suitable frusto-conical cavity can be inserted.

Figure 5:
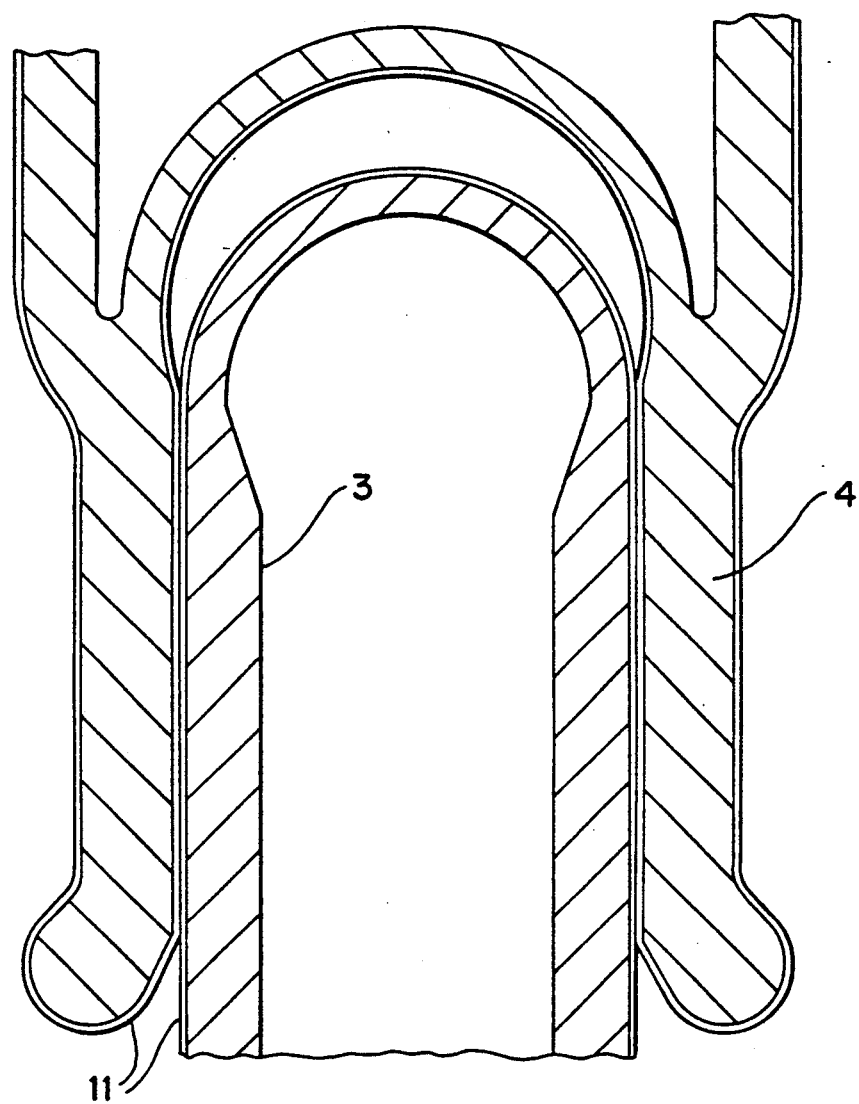
FIG. 5 shows in detail the insertion of the central journal hub into the bell shaped cavity at the end of the shaft, the cavity and the journal having oval cross-section.
Figure 6:
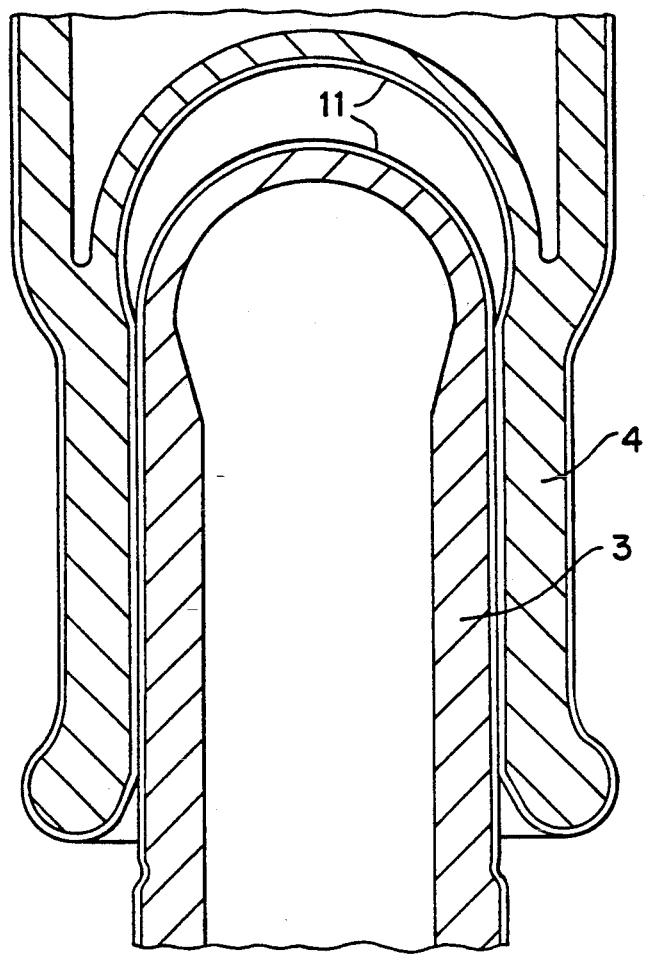
FIG. 6 shows in detail the insertion of the central journal hub into the bell shaped cavity of the shaft, the cavity and the journal having oval cross-section.

FIGS. 4 and 5 show a further possible type in which the central hub is provided with an axial vertical journal 3, which fits into the bell shaped end 4 of the stirrer shaft.

The hub may show connections with the single paddles of the type male paddle/female hub as represented on the right side of the figure or vice-versa as shown on the left side.

In all the embodiments of the invention, as mentioned above, the paddle/hub connections take place on frusto-conical surfaces accurately machined to obtain perfectly adapted contact surfaces.

The taper is suitably very small (semi-angle at vertex of the order of 1° to 2°) to allow to obtain high values of the static coupling pressure without a too high insertion pressure at the time of connecting the two parts, thus making the connection easier.

The conicity may be comprised between 5:100 and 3:100, in particular, 3:100 which allows to obtain a strong coupling with lower axial loads in the assembling.

Figure 1:
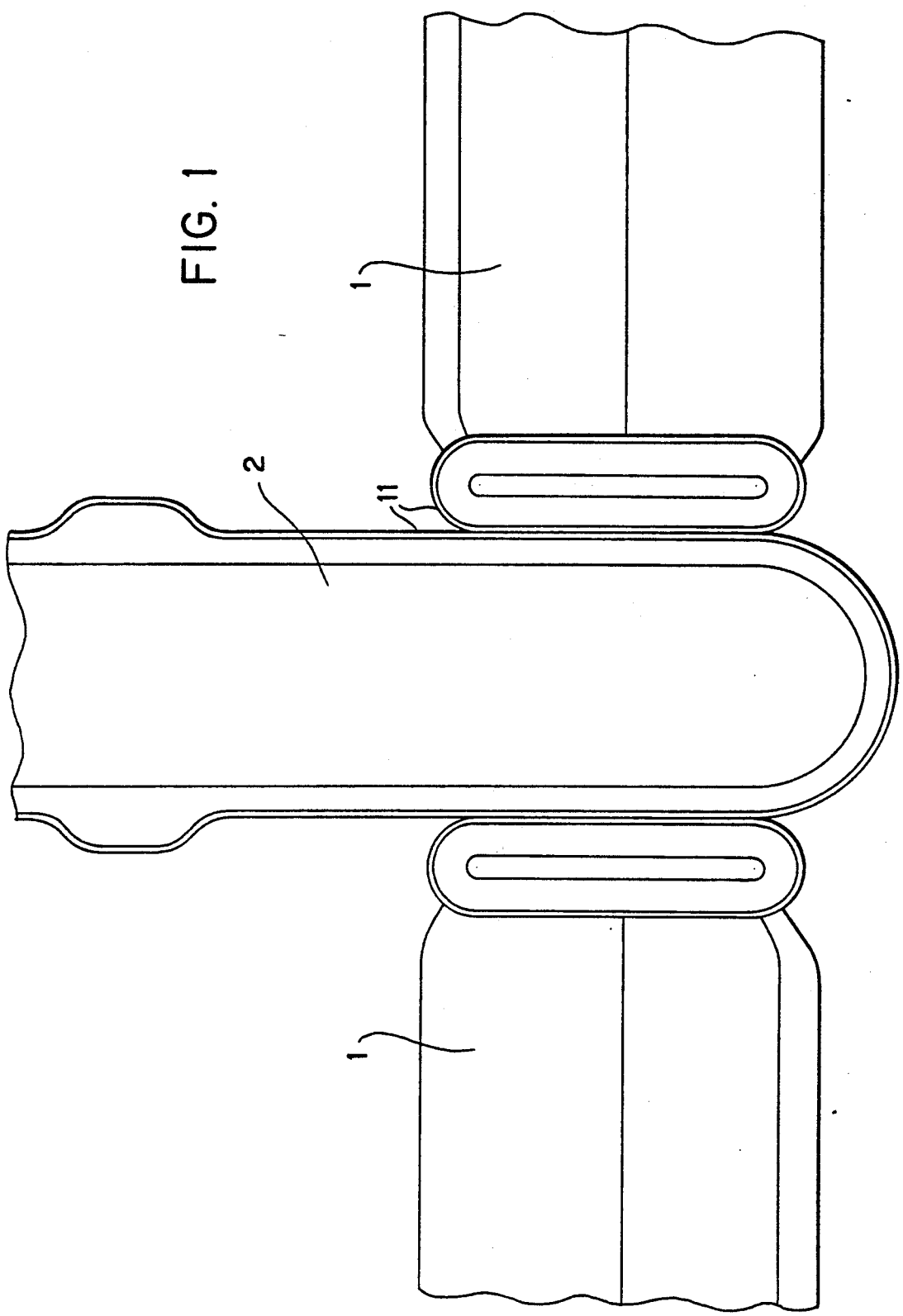
FIG. 1 is a first embodiment of the invention showing the connection between the impeller hub having a central hole and the stirrer shaft.
Figure 7:
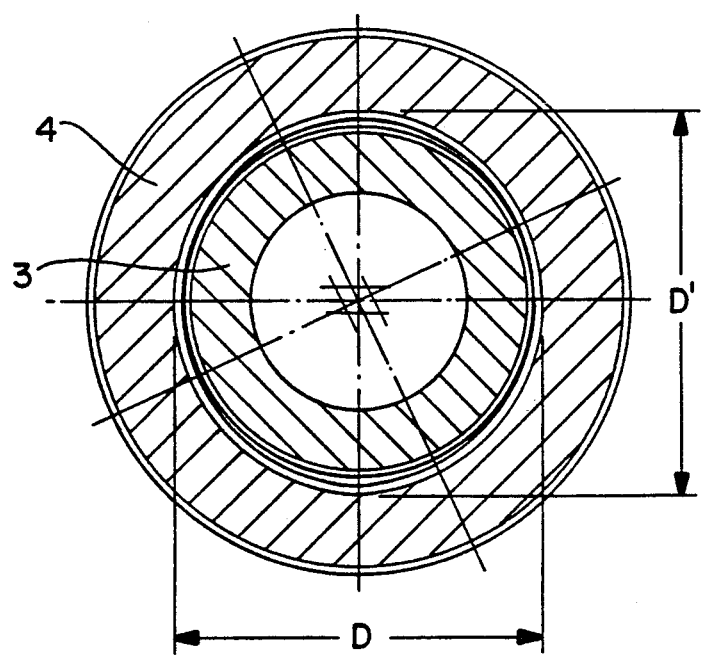
FIG. 7 shows a cross-section view of the detail of FIG. 6 showing the maximum axis D' and the minimum axis D.

According to a specific feature of the present invention the coupling between shaft and paddle hub is realized through an interference fitted connection between the cylindrical end of the shaft and the cylindrical center cavity of the hub as represented in FIGS. 1 and 3 or between the cylindrical pin facing up, provided in the center of the hub, and a corresponding cylindrical cavity in the bell shaped lower end of the shaft as represented in FIGS. 2, 4, 5, 6 and 8, the connection being characterised in that the above cylindrical elements or cavities have elliptic (or oval) shape in cross section (see FIG. 7).

Connections having such cross section shape afford a starting torque resistance much better than the prior art connections having true circular cross sections. This advantage is very important because by the use of the connection according to the invention the mechanical transmission between electric motor and agitator shaft can be direct without need of a starting device. Optimal results are obtained when a first part A of the connection has cylindrical shape with elliptic (or oval) cross section and a second part B has frusto-conical shape (see FIGS. 8 and 10). In this dual locking system, the frusto-conical part B has mainly the purpose to allow an easy assembling of the parts of the connection by assuring the centering of the inserted elliptic (or oval) element.

Figure 8:
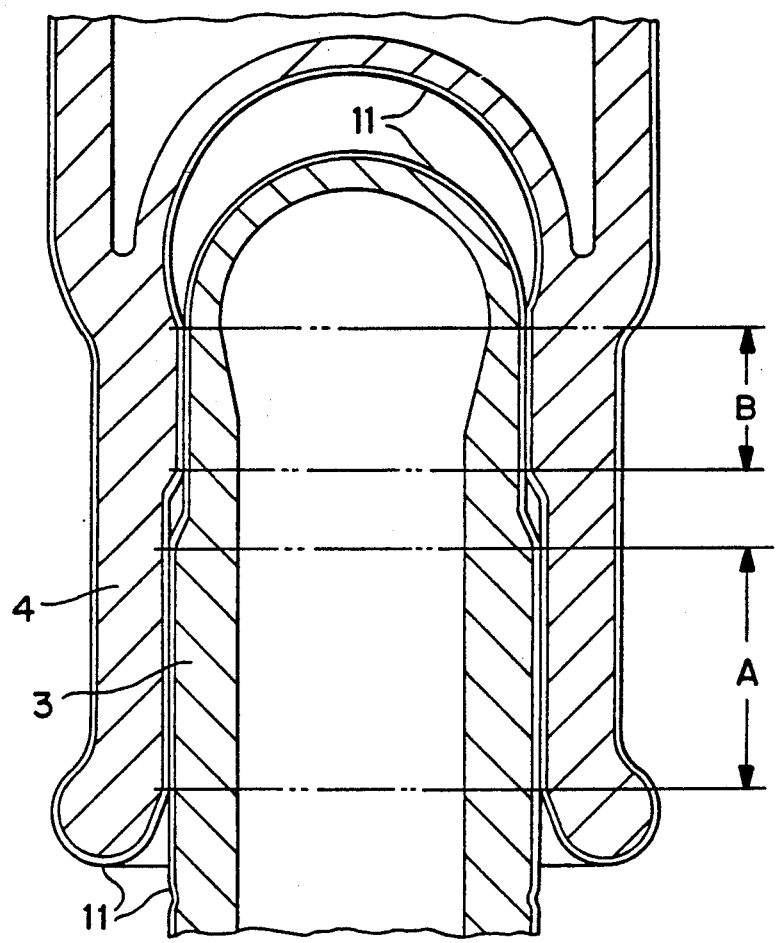
FIG. 8 shows in detail the insertion of the central journal hub into the central cavity at the end of the shaft, the cavity and the journal each having a frusto-conical part and an oval cross-section part.

In the dual locking system, the frusto-conical part B in the male element i.e. shaft in FIG. 10 or hub center pin in FIG. 8, is in the advanced (or front) position with reference to the insertion side (see FIGS. 8 and 10). Vice versa in female element (cavity), the part having tronco-conical shape is in rear position with reference to the insertion side.

It is necessary, in order to obtain the maximal strength of the elliptic (or oval) cross section connection and at the same time to realize a coupling easy to be assembled, that the difference between the maximum axis D' and the minimum axis D in the elliptic or oval cross section (see FIG. 7) be comprised between 5% and 7% and that the clearance between the connection cavity and the inserted element be about 1 mm in the direction of the maximum axis and about 1 mm in the direction of the minimum axis.

The connection according to the invention based on the elliptic (or oval) cross section elements, jams by assembling through a little torque movement (preferably in the direction opposite to the working rotation).

In the case of the dual locking system, after the above mentioned torque movement, the connection elements are subjected to an axial insertion pressure in order to obtain the blocking on the frusto-conical surfaces (part B of the connection).

Another embodiment of the invention consists in that the elliptic part and the frusto-conical part form a sole connection element which consists of a truncated cone having elliptic cross sections. Of course the insertion cavity has a corresponding shape.

Figure 2:
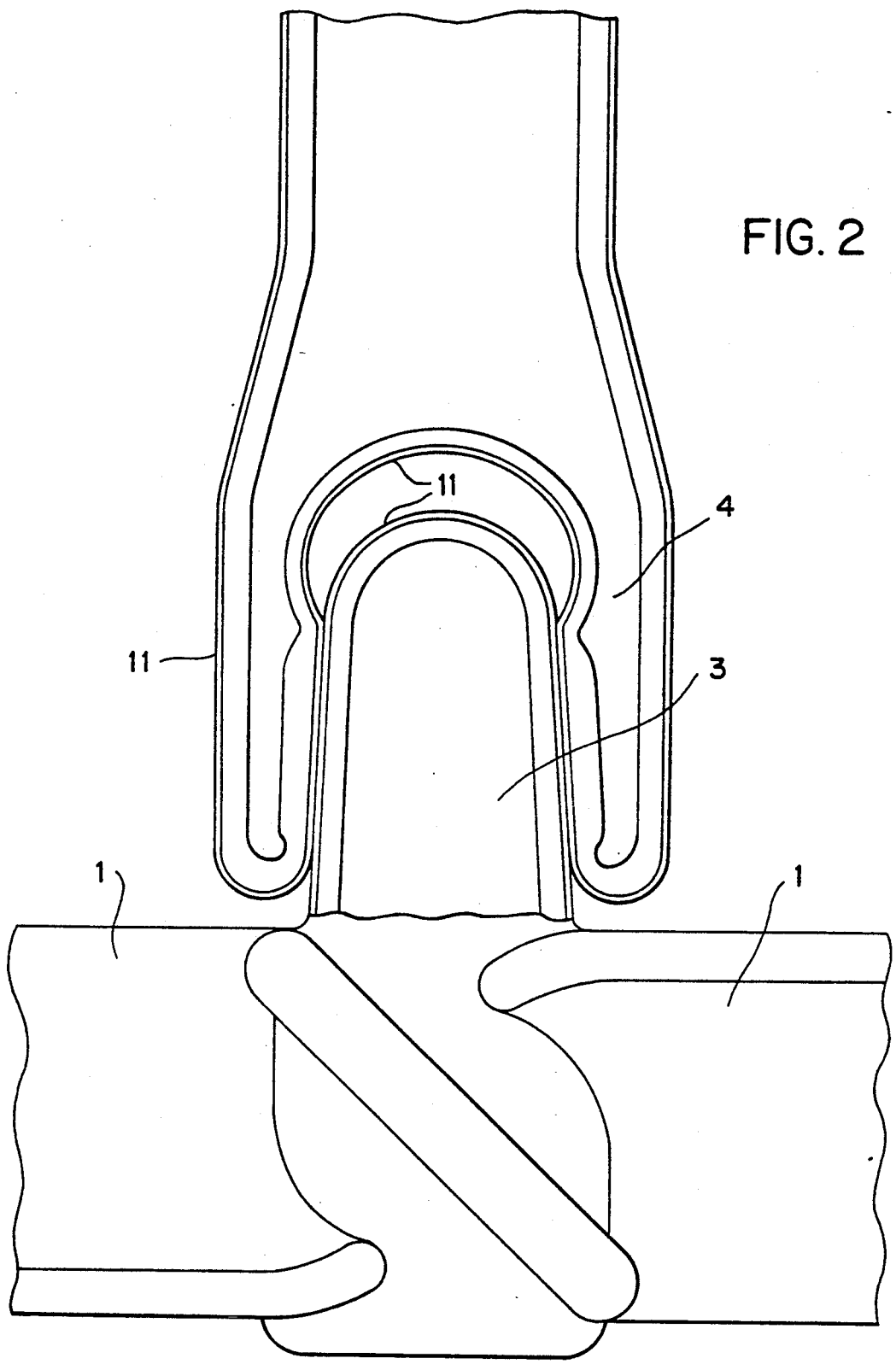
FIG. 2 is a second embodiment of the invention showing the connection of the impeller hub having a central journal, and the stirrer shaft having a bell shaped end.

As one can see from the enclosed figures, the parts forming the connections between paddle and hub and between hub and shaft are shaped in such a way as to give the structures a certain degree of elasticity; see, in particular, the cavity of the hub of FIG. 1 and the reduced thickness of the walls in the critical points, as well as the suitably curved profiles of the walls themselves in FIGS. 2-4.

Thus, an optimal mechanical resistance of the coupling is obtained, which is not altered by thermal stresses.

The female part may be made with a single wall, to simplify the construction (see FIG. 5).

Various types of impeller according to the present invention can be foreseen: the central hub may be ring shaped with an elliptic or oval or mixed elliptic-conical central hole, in which the stirrer shaft is inserted. The hub may show along its outside circumference frusto-conical cavities 6 (FIGS. 4 and 3 right side), for inserting the stems of the radially arranged paddles, or it can show radially distributed pins 7 on which each single paddle provided with a suitable frusto-conical cavity can be inserted (FIGS. 3 and 4 left side).

The cavities as well as the pins on the paddle bearing hub may be arranged in one or more layers, in other words on a single horizontal plane or on more planes at different levels.

Another embodiment of the present invention is represented in FIG. 9 wherein two propellers are places on the same shaft, FIG. 10 representing the relevant connection of the dual locking system (part A having elliptic cross section, part B frusto-conical).

FIG. 9b is a top view of one propeller of FIG. 9a.

In FIG. 11 a stirrer is represented which is charactrized by having two paddle hubs 5 placed on the shaft 2, one adjacent to the other, the shaft being the male element in this connection. The upper hub bears two paddles at 120° between them whereas the lower hub bears only one paddle.

In all the embodiments of the invention, as mentioned above, the paddle/shaft and hub/shaft connections take place on surfaces accurately machined to obtain perfectly adapted contact surfaces.

The detachable paddle stirrers of the present invention, in the various construction forms described above, show, with respect to the stirrer of the Sybron, U.S. Pat. No. 4,221,488, the advantage of not requiring in the assembling the use of cryogenic fluids or of thermal devices which may complicate the operation, while the machining of the parts does not require the extreme precision required in the case of the Sybron stirrer (precision which must be the higher, the lower the difference in temperature obtained in the assembling step). Furthermore, disassembly of single blades or of the hub is possible with the aid of a simple mechanical extraction device, while disassembling the hub of the Sybron stirrer is a complex operation based on the possibility of obtaining a high difference of temperature between two pieces in close contact with each other.

With respect to the stirrer according to the De Dietrich, European Patent No. 145,370, the ones according to the present invention show the advantage that the hub holding the paddles is a separate element which is introduced inside the reaction vessel through a manhole, and then inserted on the shaft when assembling the paddles. As a consequence, the shaft, which is mounted by inserting it through the central hole (usually of small diameter), may be sufficiently long to reach near the bottom of the vessel.

The hub attached to the shaft according to the De Dietrich patent cannot usually be inserted through the central hole (which is too small). And it is therefore necessary to insert the shaft with attached hub through the side manhole. Obviously, in this case the shaft should not be too long (total length equal to the distance between manhole and bottom of the vessel).

Thus, the hub holding the paddles will always be at a considerable distance from the bottom of the vessel.

As already pointed out, a substantial advantage of the stirrer according to the present invention over the prior art agitators having paddles hub separable from the shaft (for instance, U.S. Pat. Nos. 4,221,488 and 4,628,574), consists in the much higher resistance to the starting torque owing to the elliptic (or oval) cross section of the connection.

The equipment for assembling the paddle holding hub or of the single paddles, according to the present invention, is very simple and of a conventional type. In particular, one can use a two-part collar attached on the shaft, which is provided with bolts for pulling (or pushing in the disassembling).

Suitable swellings on the shaft (see FIGS. 1 and 3) allow to block the collar.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. In a paddles stirrer completely coated with an enamel layer and suitable for mounting in a closed coverless reaction vessel, provided with:
   a stirrer shaft having a lower end on which a hub holding the paddles is detachably fixed for operating inside the vessel, through enamel to enamel coupling on cylindrical surfaces and wherein the coupling between shaft and hub is realized by a male element consisting of the lower end of the shaft and by a female element consisting of a corresponding central hole in the hub, the improvement consisting in that the cylindrical coupling surfaces of the male element and of the female element have an oval cross section wherein the difference between the maximum and the minimum axis is comprised between 5% and 7%.

2. In the stirrer according to claim 1 wherein beside the cylindrical coupling surface the coupling further comprises a frusto-conical part which in the male element is in a rear position with reference to the insertion side whereas the oval cross section part is in a front position, and which in the female element said frusto-conical part is in a front position and the oval cross section part is in a rear position.

3. In a paddles stirrer completely coated with an enamel layer and suitable for mounting in a closed coverless reaction vessel, provided with:
   a stirrer shaft having a lower end on which a hub holding the paddles is detachably fixed for operating inside the vessel, through enamel to enamel coupling on cylindrical surfaces an wherein the coupling between shaft and hub is realized by a male element consisting of an axial vertical upwardly directed journal, provided in the hub, and by a female element consisting of the corresponding cavity in the bell shaped end of the stirrer shaft, the improvement consisting in that the cylindrical coupling surfaces of the male element and of the female element have an oval cross section wherein the difference between the maximum and the minimum axis is comprised between 5% and 7%.

4. In the stirrer according to claim 1 wherein beside the cylindrical coupling surface the coupling further comprises a frusto-conical part which in the male element is in a rear position with reference to the insertion side whereas the oval cross section part is in a front position, and which in the female element said frusto-conical part is in a front position and the oval cross section part is in a rear position.

5. In the stirrer according to claim 1, wherein the paddles form a single piece with the hub.

6. In the stirrer according to claim 1, wherein the paddles are detachably fixed on the hub through coupling on frusto-conical enamelled contact surfaces.

7. In the stirrer according to claim 3, wherein the paddles form a single piece with the hub.

8. In the stirrer according to claim 3, wherein the paddles are detachably fixed on the hub through coupling on frusto-conical enamelled contact surfaces.

* * * * *